Sept. 6, 1966    H. L. McDERMOTT    3,270,683
PORTING ARRANGEMENT FOR BALANCING VALVE OF FLUID PRESSURE DEVICE
Filed Aug. 4, 1965    5 Sheets-Sheet 1

INVENTOR.
HUGH L. McDERMOTT
BY Wayne B. Easton
ATTORNEY

INVENTOR.
HUGH L. McDERMOTT
BY Wayne B. Easton
ATTORNEY

INVENTOR.
HUGH L. McDERMOTT
BY Wayne B. Easton
ATTORNEY

United States Patent Office 3,270,683
Patented Sept. 6, 1966

3,270,683
PORTING ARRANGEMENT FOR BALANCING
VALVE OF FLUID PRESSURE DEVICE
Hugh L. McDermott, Minneapolis, Minn., assignor to
Char-Lynn Company, Minneapolis, Minn., a corporation of Minnesota
Filed Aug. 4, 1965, Ser. No. 477,207
10 Claims. (Cl. 103—130)

This invention relates to fluid pressure devices and more particularly to fluid passage porting arrangements for balancing the valves of such devices.

In fluid pressure devices of the type to which this invention pertains there are passages in relatively moveable valve parts which are periodically in fluid communication and, when such communication is established, fluid flows from the passage of one valve part, such as a rotating or orbiting valve part, to the passage of another valve part, such as a stationary valve part, or vice versa. In flowing from one valve part to another valve part, the fluid flows through ports in surfaces which are in sliding and fluid sealing engagement.

The present invention is directed to constructions in which the surfaces referred to above are either plane or cylindrical surfaces and in which a port in a moveable valve part of the device periodically moves into fluid communication with a port in a relatively stationary valve part of the device. More particularly the invention is directed to fluid pressure devices having a type of valve means which comprises relatively moveable valve parts with one valve part having a plurality of circumferentially arranged and spaced passages which contain pressurized fluid and a second valve part having a plurality of circumferentially arranged and spaced passages, which receive the pressurized fluid, the operation being such that at any instant only the passages on one side of the second valve part are receiving the pressurized fluid. This mode of operation creates a resultant force on one side of the axis of the moveable valve part which tends to cause cocking of the moveable valve part relative to the other valve part.

A main object of the invention is to provide a porting arrangement for fluid pressure devices of the type referred to which is effective to maintain the valve parts hydraulically balanced despite the valve unbalancing characteristic which is inherent in the operation of the valve means.

Other objects and advantages will become apparent from the following specification, appended claims and attached drawing.

Figures 1, 2:
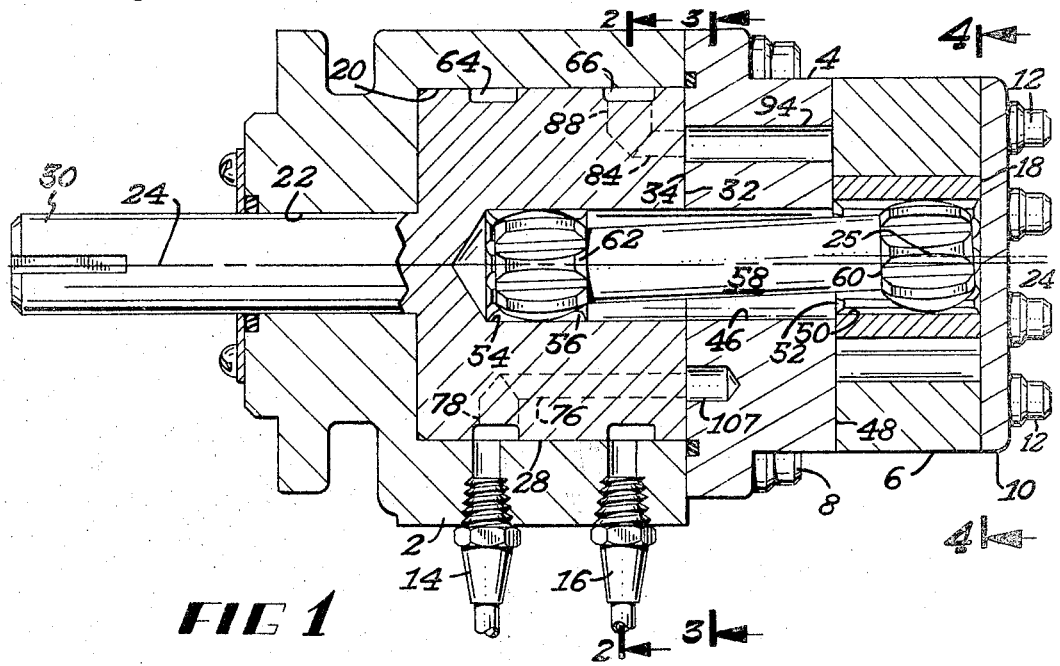
FIG. 1 is a longitudinal sectional view of a fluid pressure motor or pump embodying the invention and taken on line 1—1 of FIG. 3.
FIG. 2 is an enlarged transverse sectional view taken on line 2—2 of FIG. 1.

In the fluid pressure motor or pump illustrated in FIGS. 1 to 4 there is provided a casing or housing made of several sections which are a valve casing section 2, a fluid passage casing section 4 and a gerotor casing section 6. Casing sections 2 and 4 are held together in axial alignment by a plurality of circumferentially spaced bolts 8. An end cover plate 10 which serves as a side plate for the gerotor casing section 6 is provided and the casing sections 4 and 6 and cover plate 10 are held together in axial alignment by a plurality of circumferentially spaced bolts 12.

Casing section 2 is provided with inlet and outlet ports 14 and 16 which would be reversed for operation of the pump or motor in the opposite direction.

The shape of gerotor casing section 6 is generally cylindrical and annular and has a plurality of internal teeth. An externally toothed star member 18 having at least one fewer teeth than casing section 6, which may be referred to as a ring member 6, has the teeth thereof in meshing engagement with the teeth of ring member 6. Star member 18 partakes of a hypocycloidal movement and travels in an orbit about the axis of ring member 6. The gerotor mechanism may be used as a fluid pressure motor or pump and will be described more fully later on.

Valve casing section 2 has a generally cylindrical shape and has an axially extending bore 20 and a bore 22, both of which bores are concentric relative to the axis 24 of ring member 6. Inlet and outlet ports 14 and 16 communicate with the interior of bore 20 as shown in FIG. 1. Rotatably disposed in valve casing section 2 is a combination valve and shaft member which comprises a cylindrically shaped valve 28 which is rotatably supported in bore 20 and a shaft 30 which is rotatably supported in bore 22. Shaft 30 is an input shaft if the device is used as a pump and an output shaft if the device is used as a motor. The axial length of valve portion 28 is equal to the axial length of bore 20 so that the radial surface 32 of valve portion 28 is in slidable engagement with the adjacent radial surface 34 of casing section 4.

Figure 4:
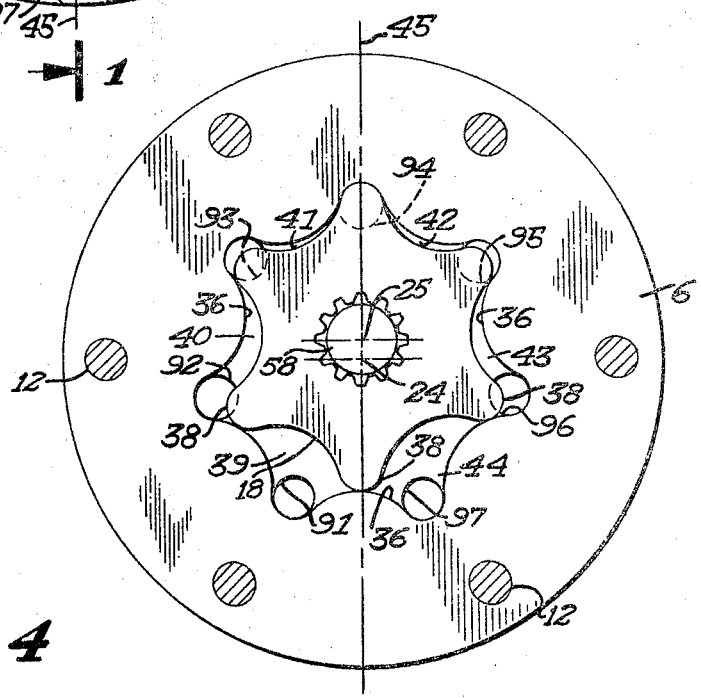
FIG. 4 is an enlarged transverse sectional view taken on line 4—4 of FIG. 1.

With reference to FIG. 4, the gerotor casing section 6, which in effect is the ring member 6, has a plurality of internal teeth 36. Externally toothed star member 18, having at least one fewer teeth 38 than ring member 6, is disposed eccentrically in the chamber or space formed and surrounded by ring member 6. Star member 18 is moveable orbitally relative to the ring member 6 with the axis 25 of star member 18 being moveable in an orbital path about the axis 24 of ring member 6. During orbital movement of star member 18 the teeth 38 thereof intermesh with the ring member teeth 36 in sealing engagement to form expanding and contracting cells 39 to 44 which are equal in number to the number of teeth 38 of star member 18.

With further reference to FIG. 4, a vertical centerline 45 incidentally represents the line of eccentricity for the star member 18 for that particular position of the star member relative to the ring member 6. The line of eccentricity is defined herein as a line which is perpendicular to and intersects the star and ring axes 25 and 24 for all orbital positions of the star 18. During orbital movement of the star member 18, and assuming the orbital movement is clockwise as viewed in FIG. 4, the cells 39 to 41 on the left side of the line of eccentricity would be expanding and the cells 42 to 44 on the right side would be contracting. If the device is used as a motor, fluid under pressure is directed to the expanding cells and exhausted from the contracting cells. If the device is used as a pump, fluid is sucked into the expanding cells and delivered under pressure from the contracting cells. The valving arrangement which facilitates the pumping or motor action will be described further on herein.

Casing section 4 has a bore 26 which is concentric relative to the axis 24 and is of small enough diameter so that the resulting annular face 48 which abuts gerotor casing section 6, along with cover plate 10, form sides for the gerotor chamber so that the expanding and contracting cells 39 to 44 formed between the teeth of the gerotor star and ring members 18 and 6 will be closed for all orbital positions of the star member 18.

Star member 18 has a bore 50 which is concentric relative to the teeth 38 thereof and the bore 50 is provided with a plurality of circumferentially arranged, axially extending teeth or splines 52. A bore 54 of valve 28, which is concentric relative to axis 24 and communicates with the bores 46 and 50 of casing section 4 and star 18, also has a plurality of circumferentially arranged, axially extending teeth or splines 56. A shaft 58, which may be referred to as a dogbone because of its general appearance, extends between and mechanically connects star 18 and valve 28 in driving relation. Heads 60 and 62 at opposite ends of dogbone 58 are frustospherically shaped and are provided with splines which are equal in number to and mesh with splines 52 and 56 of the star and valve members 18 and 28.

Star member 18 is eccentrically disposed relative to ring member 6, as mentioned above, and the dogbone shaft 58 is thus always in a cocked or tilted position relative to valve 28, which has the same axis 24 as ring member 6, and to the axis 25 of star member 18. In operation a star member 18 having six teeth will make one revolution about its own axis 25 for every six times the star member orbits in the opposite direction about the axis 24 of the ring member 6. Thus, the right end of the dogbone 58 has both orbital and rotational movement in common with the star member 18 while the left end of the dogbone has only rotational movement in common with valve 28.

The spline connections between dogbone 58 and valve 28 on the one hand, and between dogbone 58 and star member 18 on the other hand, are forms of universal joints which permit the dogbone to have the motion described above. When the device is utilized as a pump, star member 18 will be gyrated by a turning force applied to shaft 30 which is transmitted to star member 18 through the dogbone 58. When the device is used as a motor, the force created by the rotation of star member 18 about its own axis 25 will be transmitted through dogbone 58 to shaft 30 to cause turning of shaft 30.

Figure 3:
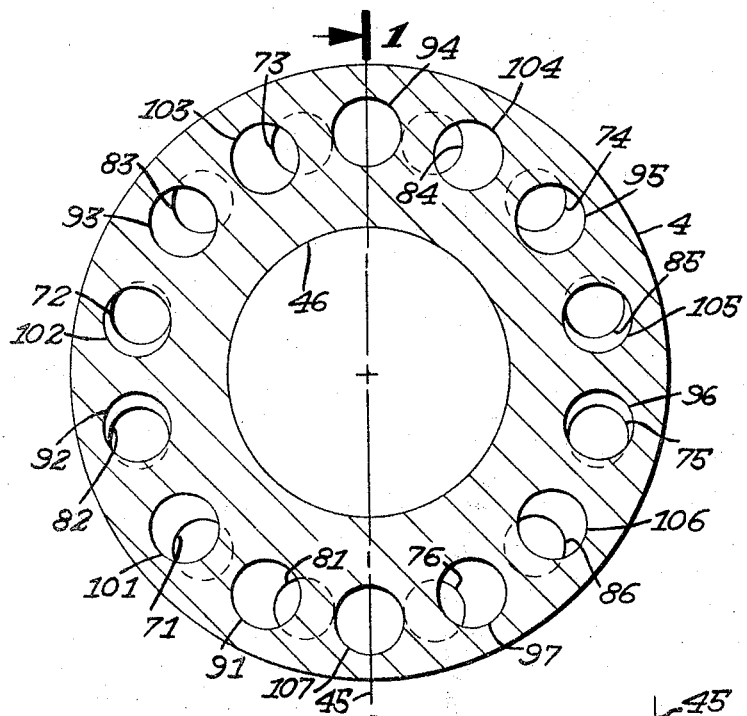
FIG. 3 is an enlarged transverse sectional view taken on line 3—3 of FIG. 1.

Valve 28 and casing section 4 are provided with fluid passages through which fluid is conveyed from the port 14 or 16 to the cells of the gerotor on one side of the line of eccentricity 45 and exhausted from cells on the other side of the line of eccentricity to the other of the ports 14 or 16. Port 14 or 16 will be the inlet, and the other the outlet port, depending on the direction of rotation desired for shaft 30. Valve 28, by reason of the dogbone connection between it and star 18, will rotate at the same speed as the star 18 but in the opposite direction from the orbiting direction of the star 18. Valve 28 has two axially spaced annular channels 64 and 66 which are axially aligned with ports 14 and 16 and in respective fluid communication therewith. With reference to FIGS. 1, 2 and 3, valve 28 has a plurality of axially extending, circumferentially arranged and spaced passages which are illustrated herein as a set of six passages 71 to 76 of circular cross section which are in fluid communication through six radial passages 78 with annular channel 64 and port 14 and a set of six passages 81 to 86, alternately spaced relative to passages 71 to 76, which are in fluid communication through six radial passages 88 with annular channel 66 and port 16. In the fluid pressure device illustrated, the passages 71 to 76 and the passages 81 to 86 are equal in number to the number of teeth 38 on the star 18. Passages 71 to 76 and 81 to 86 open into recesses in the radial face 32 of valve 28 and such openings will be referred to in detail further on herein. At this point, however it should be noted that the word "opening" as used herein specifically means the shape or configuration of a passage in the plane of valve surface 32 or valve surface 34.

Casing section 4 has a plurality of axially extending, circumferentially arranged and spaced passages 91 to 97 of circular cross-section (see FIGS. 1, 3 and 4) illustrated as being seven in number which is equal to the number of teeth 36 of the ring member 6. Passages 91 to 97 open into and have openings in the radial face 34 of casing section 4 which face slidingly engages the radial face 32 of valve 28. Casing section 4 also has a plurality of axially extending, circumferentially arranged and spaced recesses 101 to 107 of the same circular cross section as passages 91 to 97 which are alternately spaced relative to passages 91 to 97. Recesses 101 to 107 also open into and have openings in the radial face 34 of casing section 4.

Passages 91 to 97 and recesses 101 to 107 are shown as having larger diameters than passages 71 to 76 and 81 to 86 but that was done only for the purpose of making FIG. 3 easier to understand. In practice the diameters of all passages and the recesses may be the same if desired.

Upon rotation of valve 28, each of the openings of passages 71 to 77 and 81 to 87, successively registers in fluid communication with each of the openings of passages 91 to 97 in casing section 4. Fluid is supplied to and withdrawn from the gerotor through passages 91 to 97 which terminate at points which constitute junctions (see FIG. 4) between the teeth 36 of ring member 6.

Assuming that the fluid pressure device is functioning as a motor and that pressurized fluid is introduced through port 16, the fluid will flow into annular channel 66 and through passages 81 to 86 in valve 28. When valve 28 and star 18 are in the position shown in FIGS. 3 and 4, fluid will be flowing from valve passages 81 to 83 into valve passages 91 to 93 on the left side of the line of eccentricity 45 as viewed in FIG. 3 to the gerotor cells 39 to 41 on the left side of the line of eccentricity as viewed in FIG. 4. The flow of fluid to cells 39 to 41 causes expansion of these cells and causes star 18 to gyrate in a clockwise direction and causes collapsing of the cells 42 to 44 on the right side of the line of eccentricity 45. Fluid from the collapsing cells 42 to 44 flows through casing passages 95 to 97 on the right side of the line of eccentricity 45, as viewed in FIGS. 3 and 4, through all of the valve passages 74 to 76 on the right side of the line of eccentricity, through annular channel 64 and out through port 14. The above description of fluid flow is only for an instantaneous condition in that the line of eccentricity 45 rotates about the axis 24 of ring member 6. As long as pressurized fluid is admitted through port 16, however, the pressurized fluid will always be admitted to gerotor cells on the same side of the line of eccentricity 45 and fluid will always be exhausted on the other side of said line.

During orbiting of star 18 about ring member axis 24, the star rotates in the opposite direction about its own axis 25 at a slower speed. The ratio between the orbiting and rotating speeds is dependent upon the ratio between the ring and star member teeth. If that ratio is seven to six as illustrated herein, the rotating speed of the star will be one-sixth of its orbiting speed. By reason of the dogbone connection between star 18 and valve 28, valve 28 rotates at the same speed and in the same direction as star 18. Valve 28 is a commutating type valve in that it rotates at the same speed that star 18 rotates but it functions to supply and exhaust fluid to and from the gerotor at the orbiting frequency of the star.

The recesses 101 to 107 are an integral part of the invention. In explaining their function, however, it is convenient to first explain how a commutating type of valve is subject to fluid pressure forces which tend to unbalance the valve. In making this explanation reference will be made mainly to FIG. 3 and it will be assumed that the recesses 101 to 107 are not present.

It is noted above that when fluid under pressure is admitted to port 16 all of the passages 81 to 86 are supplied with pressurized fluid which occupies all of these passages at all times. In the absence of recesses 101 to 107 or other balancing means, valve 28 will be subjected to unbalanced pressure forces at all times regardless of its position relative to the passages 91 to 97 in casing section 4. When valve 28 is in the position shown in FIG. 3, for example, the unbalancing of valve 28 results from the following conditions: The opening of passages 81, 82 and 83 overlap the openings of passages 91, 92 and 93 in varying degrees and pressurized fluid thus flows from passages 81, 82 and 83, respectively, to passages 91, 92 and 93. At that instant a first axially directed resultant reaction force proportional to the combined areas of the openings of passages 81 to 83 and 91 to 93, minus the overlapped areas, acts between valve 28 and casing section 4 on the left side of the line of eccentricity 45 to separate valve 28 from casing section 4. On the right side of the line of eccentricity, and still assuming the recesses 101 to 107 are not present, passages 84, 85 and 86 do not have fluid communication with any passages in casing section 4 and the pressurized fluid in passages 84 to 86 is thus simply exerted against flat portions of the annular surface 34 of casing section 4. At that instant, therefore, a second axially directed resultant reaction force proportional only to the combined areas of the openings of passages 84 to 86 acts to separate valve 28 from casing section 4 on the right side of the line of eccentricity 45. As the first named resultant force is larger than the second named resultant force, a net force which is the difference between the first and second forces is effective to tend to cause cocking of valve 28. The tendency of valve 28 to cock is of course undesirable from the bearing standpoint because compensatory thrust bearing forces must be applied to the other axial direction and this is necessarily accompanied by higher friction losses. Another disadvantage is that, to the extent the unbalanced forces cannot be compensated for, the annular surfaces 32 and 34 would not be in close sealing engagement over their entire areas.

Balancing of valve 28 is obtained according to the present invention by providing recesses 101 to 107 in casing section 4 which have openings in the annular surface 34 thereof which are symmetrically arranged and alternately spaced relative to the openings that passages 91 to 97 form in the annular surface 34 and are identical in shape to such passage openings. The depths of recesses 101 to 107 are not important. The forms of the openings of recesses 101 to 107 in surface 34 are illustrated as being circular but the only critical requirement for such openings is that they be the same size and shape and have the same orientation as the openings for passages 91 to 97.

Referring again to FIG. 3, it may be observed that for each passage opening 91, 92 or 93 that is in respective overlapping relation to a pressurized passage opening 81, 82 or 83 on the left side of the line of eccentricity 45, there is a recess or blank passage opening 104, 105 or 106 that is in respective overlapping relation to a pressurized passage opening 84, 85 or 86 on the right side of the line of eccentricity. At any instant, therefore, one-half of the pressurized passages 81 to 86 are paired with one-half the fluid passages 91 to 97 on one side of the line of eccentricity and the other half of the pressurized passages 81 to 86 are paired with one-half the recesses 101 to 107 on the other side of the line of eccentricity.

The above described arrangement is exactly symmetrical for all positions of valve 28. For the position of valve 28 shown in FIG. 3, for example, the symmetry is illustrated by (1) the combined areas of pressurized passage opening 81 and passage opening 91, minus the overlapped area, being equal to the diametrically opposite combined areas of pressurized passage opening 84 and recess opening 104, minus the overlapped area, (2) the combined areas of pressurized passage opening 82 and passage opening 92, minus the overlapped area, being equal to the diametrically opposite combined areas of pressurized passage opening 85 and recess opening 104, minus the overlapped area, and (3) the combined areas of pressurized passage opening 86 and recess opening 106, minus the overlapped area.

With the addition of the recesses 101 to 107 as described above, the resultant force attributable to the pressurized fluid in passages 84, 85 and 86 which tends to separate the surfaces 32 and 34 on the right side of the line of eccentricity 45 is increased and made equal to the resultant force on the other side of the line of eccentricity which is attributable to the pressurized fluid in passages 81, 82 and 83. With the addition of recess 104, for example, the pressurized fluid in passages 84 acts over a net area which is equal to the combined areas of passage opening 84 and recess opening 104 minus the overlapped areas, and this net area is equal to the net areas represented by passage openings 91 and 81 which at that instant are on the diametrically opposite side of valve 28. The pressures of the fluid in passages 81 and 84 are substantially equal and, as the net areas referred to are equal, the resultant forces on diametrically opposite sides of the valve 28 are equal. The same observations may also be made by noting that (1) the net area of passage openings 82 and 92 is equal to the net area of passage opening 85 and recess opening 105 and (2) the net area of passage openings 83 and 93 is equal to the net area of passage opening 86 and recess opening 106.

In the fluid pressure motor or pump illustrated in FIGS. 5 to 8 there is provided a casing or housing made of several sections which are a generally annularly shaped gerotor casing section 110, a disk shaped fluid passage casing section 111 and a disk shaped end cover plate 112. Gerotor casing section 110, casing section 111 and end cover plate 112 are held together in axial alignment by a plurality of circumferentially spaced bolts 113.

End cover plate 112 is provided with inlet and outlet ports 114 and 115 which would be reversed for operation of the pump or motor in the opposite direction.

The device has a main axis 116. Gerotor casing section 110 has a bore 117 and counterbores 118 and 120 which are generally concentric relative to the axis 116. Disposed in counterbore 118 is a gerotor which comprises a star member 122 and a ring member 124 which have relative rotational and orbital movement therebetween. Gerotor star 122 is an externally toothed gear having teeth 123 which is fixedly fastened to a shaft 126 which is journaled for rotation about axis 116 in the bore 117 of casing section 110. Gerotor ring 124 is an internally toothed gear having at least one more tooth 125 than star 122 and has the teeth thereof in meshing engagement with the teeth of star 122. Ring 124 has an axis 128 and is eccentrically disposed relative to star 122 so that during relative orbital movement between ring 124 and star 122 the ring axis 128 travels in an orbit about the axis 116 of star 122.

The gerotor which comprises star 122 and ring 124 has two side plates associated therewith which are an annularly shaped plate 130 and a round plate 132. Side plates 130 and 132 are fixedly attached to ring 124 with a plurality of circumferentially spaced bolts 133. The outer radial surface 134 of side plate 132 is in abutting, sliding and sealing engagement with the adjacent radial surface 136 of casing section 111. The outer radial surface 138 of side plate 130 may either be in abutting engagement with the radial surface 140 of bore 118 as shown or means (not shown) may be provided such as fluid pressure means or resilient means for biasing the gerotor and side plate until in the direction of the radial surface 136 of casing section 111.

In the operation of the device star 122 is rotatable about axis 116. Ring 124 has orbital movement about axis 116 but has no rotational movement relative to the casing of the device.

Figure 5:
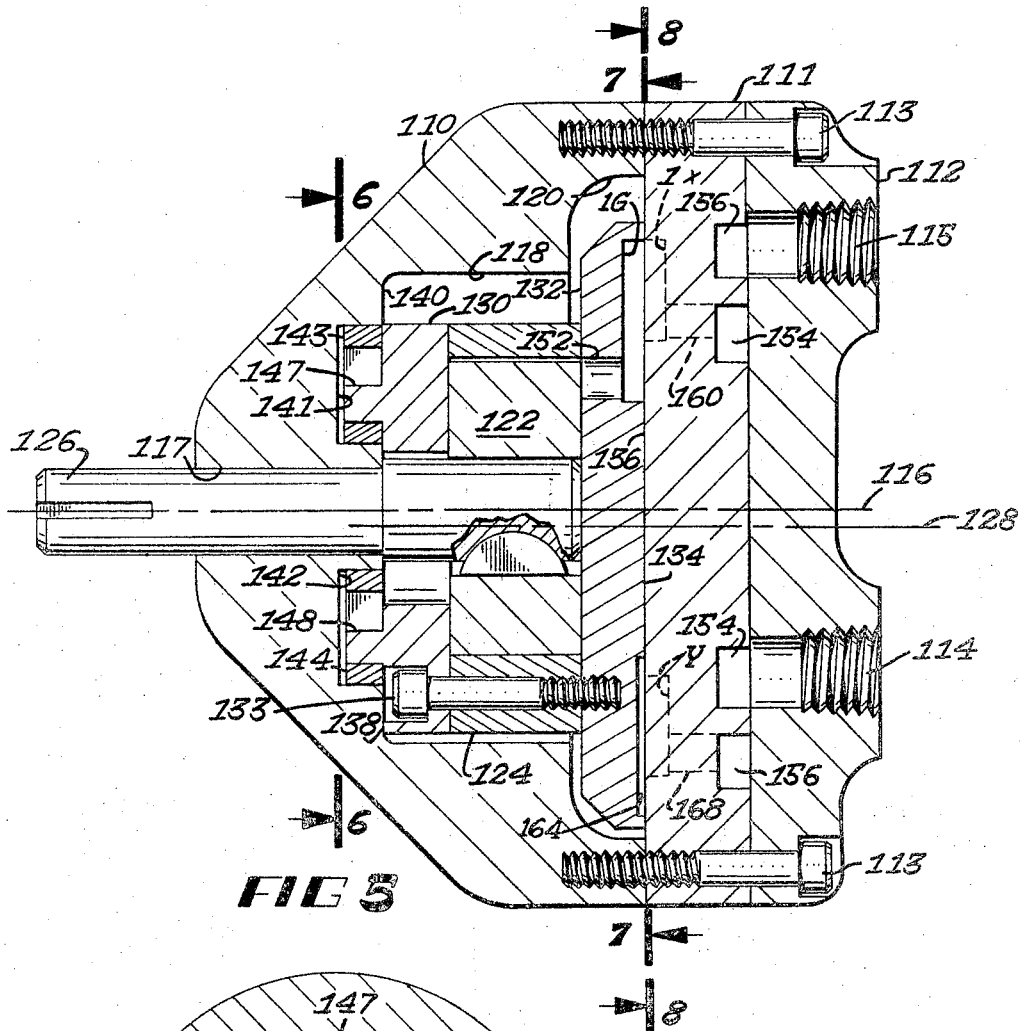
FIG. 5 is a longitudinal view of a fluid pressure pump or motor which is a second embodiment of the invention and is taken on lines 5—5 and 5'—5' of FIG. 8.
Figure 6:
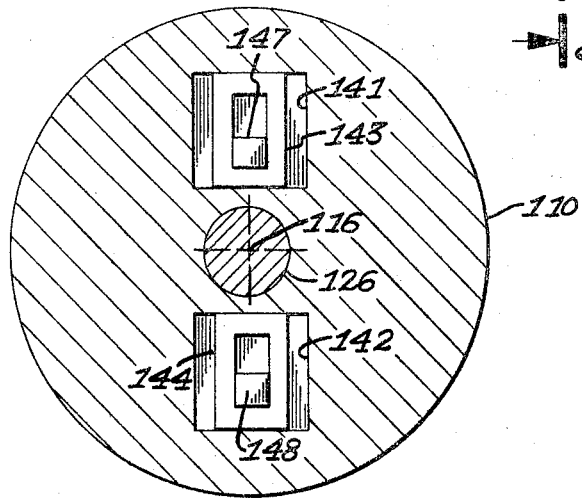
FIG. 6 is a transverse sectional view taken on line 6—6 of FIG. 5.

The desired orbital and nonrotational movement for ring 124 is facilitated by means shown in FIGS. 5 and 6. Recessed relative to the surface 140 of bore 118 are two recesses 141 and 142 which are square in section (see FIG. 6) and are symmetrically arranged relative to axis 116. Slidably disposed in recesses 141 and 142 are oblong and rectangularly shaped boxes 143 and 144 which are arranged in upright positions so as to be horizontally slidable in recesses 141 and 142. Gerotor plate 130 has two rectangularly shaped studs 147 and 148 which are disposed in the openings formed by boxes 143 and 144 so as to be vertically slidable relative to the boxes 143 and 144. This arrangement of studs and boxes has the purpose and function of preventing rotation of ring 124 relative to axis 116 but permitting the ring to otherwise move in vertical and horizontal directions relative to axis 116.

It is mentioned above that the rotation of shaft 126 will cause the star 122 to rotate about axis 116. As the ring 124 is prevented from rotating by the stud and box arrangement, the ring will follow an orbital path with the ring axis 128 orbiting the star axis 116. In operation a star 122 having six teeth will make one revolution about its own axis 116 for every six times the ring 124 orbits in the opposite direction about the axis 116. During orbital movement of ring 124 the teeth 125 thereof intermesh with the star teeth 123 in sealing engagement to form expanding and contracting cells A to F (see FIG. 7) which are equal in number to the number of teeth 126 of star 122. A vertical centerline 150 incidentally represents the line of eccentricity for the particular position illustrated in FIG. 7 of the ring 124 relative to the star 122. The line of eccentricity is defined herein as a line which is perpendicular to and intersects the star and ring axes 116 and 128 for all orbital positions of the ring 124 relative to the star 122. During orbital movement of ring 124, and assuming the orbital movement is counterclockwise as viewed in FIG. 7, the cells A to C on the right side of the line of eccentricity would be expanding and the cells D to F on the left side would be contracting. If the device is used as a motor, fluid under pressure is directed to the expanding cells and exhausted from the contracting cells. If the device is used as a pump, fluid is sucked into the expanding cells and delivered under pressure from the contracting cells. The valving arrangement which facilitates the pumping or motor action will now be described.

The device is provided with passages through which fluid is conveyed from the port 114 or 115 to the cells of the gerotor on one side of the line of eccentricity 150 and exhausted from cells on the other side of the line of eccentricity to the other of the ports 114 or 115. Port 114 or 115 will be the inlet, and the other the outlet port, depending on the direction of rotation desired for shaft 126. Shaft 126 will rotate at the same speed as the star 122 but in the opposite direction from the orbiting direction of the ring 124.

Passages are provided in gerotor side plate 132 and casing section 111 through which fluid is admitted to the expanding gerotor cells and exhausted from the collapsing gerotor cells. In the gerotor side plate 132 are a plurality of circumferentially arranged, axially extending passages 152 which are illustrated as being seven in number which is equal to the number of teeth 125 of the ring 124. Passages 152 have fluid communication with the chamber defined by the ring 124 at the respective junctions between ring teeth 125. The outward side of side plate 132 is provided with a plurality of slots 1G to 7G (see FIGS. 5 and 7) which are recessed relative to surface 134 and which have fluid communication with passages 152. Slots 1G to 7G are circumferentially arranged and extend radially relative to the ring axis 128. Each of the slots 1G to 7G has parallel sides which are equal distances from a radial line which extends through axis 128 and said parallel sides are spaced apart a distance equal to two-thirds of the distance that ring 124 is eccentric relative to the star 122.

Casing section 111 is provided with slots 1X to 7X and 1Y to 7Y (see FIGS. 5 and 8) which are recessed relative to the surface 136 thereof and which cooperate with slots 1G to 7G to facilitate the supplying and exhausting of fluid to and from slots 1G to 7G. Pairs of slots 1X–1Y, 2X–2Y, etc. are equally spaced and in circumferentially arranged relation relative to the star axis 116. The slots of each of the pairs such as pair 1X–1Y have parallel sides and the two slots of each pair are spaced apart a distance equal to the width of each slot which is two-thirds the distance that ring 124 is eccentric relative to star 122. Each pair of slots such as the pair 1X–1Y is symmetrically arranged relative a radial line that extends through the axis 116.

On the side of casing section 111 opposite from the slots 1X to 7X and 1Y to 7Y are two annular channels 154 and 156 which have respective fluid communication with the inlet and outlet ports 114 and 115. The slots 1X to 7X have fluid communication with annular channel 154 and inlet port 114 through axially extending passages 160. The slots 1Y to 7Y have fluid communication with annular channel 156 and outlet port 115 through axially extending passages 162. If pressurized fluid is introduced through inlet port 114 it will flow into annular channel 154, through passages 160 into slots 1X to 7X. In the operation of the device the orbiting of the ring 124 causes each of the slots 1G to 7G to orbit relative to each of the pairs of slots 1X–1Y to 7X–7Y. During the orbital movement of ring 124 a gerotor slot such as slot 1G has fluid communication during half of each orbiting cycle with a feed slot such as slot 1X and fluid communication with an exhaust slot such as slot 1Y during the other half of the orbiting cycle. At any instant, however, the gerotor slots 1G to 7G have different or varying overlapping positions relative to the pairs of feed and exhaust slots (1X–1Y, 2X–2Y, etc.) with which they have fluid communication. With the ring 124 in the position shown in FIG. 7, for example, the gerotor slots 5G to 7G on the right side of the line of eccentricity 150, which at that instant are connected to the expanding cells A to C, register in varying degrees with the feed slots 5X to 7X. Likewise, the gerotor slots 2G to 4G on the left side of the line of eccentricity 150, which at that instant register with the collapsing cells D to F, register in varying degrees with the exhaust slots 2Y to 4Y. The ring 24 orbits in unison with the rotation of the line of eccentricity 150 and during orbiting of the ring the valving arrangement described will cause the feeding and exhausting fluid to always be on opposite sides of the line of eccentricity whether the device is operated as a motor or a pump.

In the absence of some kind of fluid pressure balancing means, the valving arrangement described will cause gerotor side plate 132 to be subjected to unbalanced pressure forces at all times regardless of its position relative to the casing slots 1X to 7X and 1Y to 7Y in the same manner as valve 28 in the first embodiment of the invention. Balancing of gerotor side plate 132 is obtained in accordance with the present invention by providing pseudo feed and exhaust slots in the surface 136 of casing section 111 and a plurality of recesses 164 in the surface 134 of gerotor side plate 132. Recesses 164 have openings in the surface 134 which are symmetrically arranged and alternately spaced relative to the openings that slots 1G to 7G form in the surface 134 and are identical in shape to such openings. The axial depths of recesses 164 are not important but their openings in the surface 134 should have the same size and shape and have the same orientation as the openings for slots 1G to 7G.

Casing section 111 is provided with a set of pseudo feed and exhaust slots X and Y which is arranged symmetrically relative to and identical in all respects to the set of feed and exhaust slots which comprises slots 1X to 7X and 1Y to 7Y except that the slots X and Y of each pair of slots are transposed. The pseudo feed and exhaust slots X and Y are connected respectively to the inlet and outlet ports 114 and 115 through short axial passages 166 and 168, similar to passages 160 and 162, which connect slots X and Y to annular channels 154 and 156. Pseudo feed and exhaust slots X and Y are referred to as "pseudo" slots because, although they are connected to the inlet and outlet ports 114 and 115, they do not function to feed and exhaust fluid to and from the gerotor cells A to F.

Figure 7:
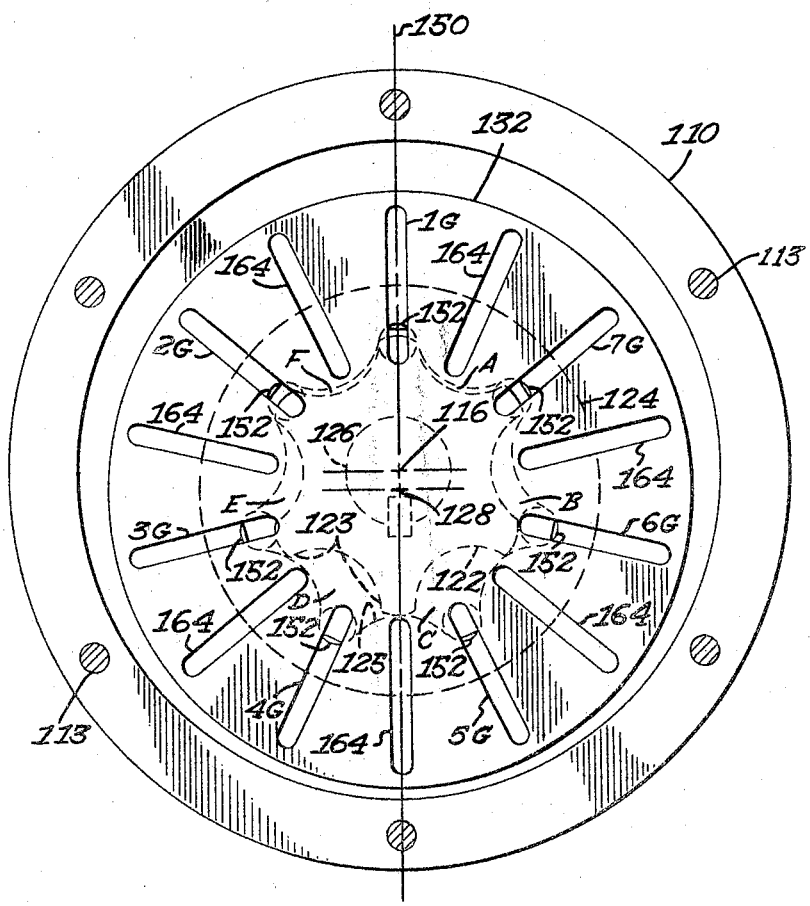
FIG. 7 is a transverse sectional view taken on line 7—7 of FIG. 5.
Figure 8:
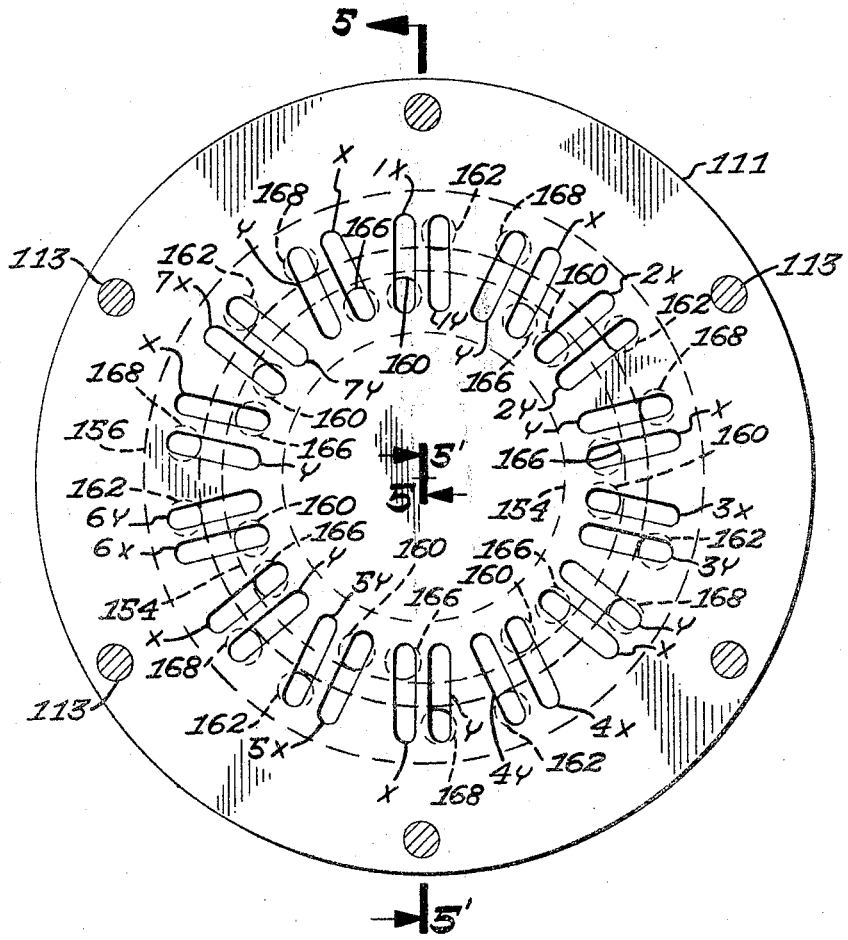
FIG. 8 is a transverse sectional view taken on line 8—8 of FIG. 5.

Referring to FIGS. 7 and 8, the fluid pressure balancing which is effected by the addition of slots 164 in gerotor side plate 132 and the slots X and Y in casing section 111 is the same or similar in principle to the balancing achieved in the first embodiment of the invention. Assuming that pressurized fluid is admitted through inlet port 114 and that ring 124 is in the position illustrated, it may be noted by superimposing FIG. 8 on FIG. 7 that for each gerotor slot 5G to 7G that is in respective overlapping relation to a pressurized casing feed slot 5X to 7X on the right side of the line of eccentricity 150 (as viewed in FIG. 7) there is a blank slot 164 on the left side of the line of eccentricity that is in overlapping relation to a pseudo feed slot X on the left side of the line of eccentricity. Furthermore, for any position of ring 124, (1) the gerotor slots 1G to 7G that are on the feed side of the line of eccentricity will be in overlapping relation in varying degrees to feed slots 1X to 7X that are on the feed side of said line and (2) the blank gerotor slots 164 that are on the exhaust side of the line of eccentricity will be in overlapping relation in varying degrees to pseudo feed slots X that are on the exhaust side of said line.

The above described overlapping of passage and recess openings is exactly symmetrical for all positions of ring 122. For the position of ring 122 shown in FIGS. 4 to 8, for example, the symmetry may be observed by noting that the combined areas of feed slots 5X to 7X and gerotor slots 5G to 7G, minus the overlapped area, is equal to the combined areas of feed slots 2X to 4X and the blank slots 164 on the other side of the line of eccentricity 150, minus the overlapped area. With the addition of the blank slots 164 in gerotor side plate 132 and the pseudo feed and exhaust slots X and Y in casing section 111 as described above, the resultant force attributable to the pressurized fluid in feed slots 2X to 4X which tends to separate the surfaces 134 and 136 on the left side of the line of eccentricity 150 is increased and made equal to the resultant force on the other side of the line of eccentricity which is attributable to the pressurized fluid in feed slots 5X to 7X. The pressurized fluid in feed slot 5X, for example, acts over a net area which is equal to the combined areas of feed slot 5X and gerotor slot 5G, minus the overlapped area, and this net area is equal to the net area represented by a pseudo feed slot X and a blank gerotor slot 164 which at that instant are in diametrically opposite positions relative to slots 5X and 5G. The same observations may also be made at any instant in the orbiting cycle with respect to each of the other combinations of feed and gerotor slots such as 6X–6G, 7X–7G, etc.

It will be understood that either of the ports 114 or 115 may be the inlet port. If pressurized fluid is admitted through port 115, for example, fluid will be fed to the gerotor cells A to F through slots 1Y to 7Y and the slots Y in casing 111 will then have the function of pseudo feed slots to provide a balanced fluid pressure condition. Port 114 has thus been referred to herein as the inlet port only for the sake of convenience in describing the second embodiment of the invention.

While two embodiments of the invention are described here, it will be understood that other modifications are possible, and that such modifications, including a reversal of parts, may be made without departure from the spirit and scope of the invention as defined in the claims.

What I claim is:

1. A rotary fluid pressure device comprising a casing, fluid inlet and outlet means, an internally toothed ring member, a cooperating externally toothed star member having fewer teeth than said ring member disposed eccentrically relative to the axis of said ring member, one of said members having rotational movement about its own axis and one of said members having orbital movement about the axis of the other of said members with the teeth of said members intermeshing in sealing engagement to form expanding cells on one side of the line of eccentricity and contracting cells on the other side of said line during relative movement between said members, first and second relatively movable valve elements having respective first and second slidably engaging surfaces with one of said valve elements being movable in synchronism with one of said movements of one of said members, said first valve element having a plurality of passages communicating with said expanding and contracting cells and having passage openings defined in said first surface arranged circumferentially relative to the axis thereof, said second valve element having ports having openings defined in said second surface arranged circumferentially relative to the axis thereof, said ports including a first group of ports having constant fluid communication with said inlet means and a second group of ports having constant fluid communication with said outlet means, said first valve element passage openings being registerable with at least a portion of said second valve element port openings during relative movement between said members to direct fluid from said fluid inlet means to said expanding cells and to direct fluid from said contracting cells to said fluid outlet means, and a plurality of circumferentially arranged fluid pressure balancing recesses in said first valve surface having openings in said first surface which are alternately and symmetrically arranged relative to said passage openings and are equal in number to said passage openings.

2. A fluid pressure device according to claim 1 wherein said ring member is stationary relative to said casing and said star member has rotatable movement about its own axis and orbital movement about the axis of said ring member.

3. A fluid pressure device according to claim 2 wherein said second valve element is separate from said star member.

4. A fluid pressure device according to claim 3 having means connecting said star member and said second valve element for rotating said second valve element synchronously with said rotational movement of said star member.

5. A fluid pressure device according to claim 3 wherein said second valve element is generally cylindrical in shape and said first and second surfaces are in a common plane perpendicular to the axis of said ring member.

6. A fluid pressure device according to claim 4 wherein said second valve element is generally cylindrical in shape and said first and second surfaces are in a common plane perpendicular to the axis of said ring member.

7. A fluid pressure device according to claim 2 wherein said port openings of said first group of ports are arranged alternately relative said port openings of said second group of ports.

8. A fluid pressure device according to claim 1 wherein said ring member orbits relative to said casing and said star member has rotatable movement about its own axis.

9. A fluid pressure device according to claim 8 wherein said first valve element is attached to and orbits with said ring member.

10. A fluid pressure device according to claim 8 wherein said second valve element ports include circumferentially spaced pairs of fluid feeding and exhausting ports which are cyclically registerable with said first valve passages and circumferentially spaced pairs of pseudo fluid feeding and exhausting ports which are cyclically registerable with said first valve fluid pressure balancing recesses.

References Cited by the Examiner
UNITED STATES PATENTS

| | | | |
|---|---|---|---|
| Re. 25,126 | 2/1962 | Charlson | 91—56 |
| Re. 25,291 | 12/1962 | Charlson | 91—56 |
| 2,132,812 | 10/1938 | Wahlmark | 103—126 |
| 2,758,573 | 8/1956 | Krozal | 91—56 |
| 2,871,831 | 2/1959 | Patin | 103—130 |
| 2,989,951 | 6/1961 | Charlson | 103—130 |
| 3,087,436 | 4/1963 | Dettlof et al. | 103—130 |
| 3,215,043 | 11/1965 | Huber | 230—145 |

MARK NEWMAN, *Primary Examiner.*
W. J. GOODLIN, *Assistant Examiner.*